Oct. 4, 1927.
H. N. OLIVER
SEED PLANTER
Filed Jan. 29, 1925
1,644,602
2 Sheets-Sheet 1
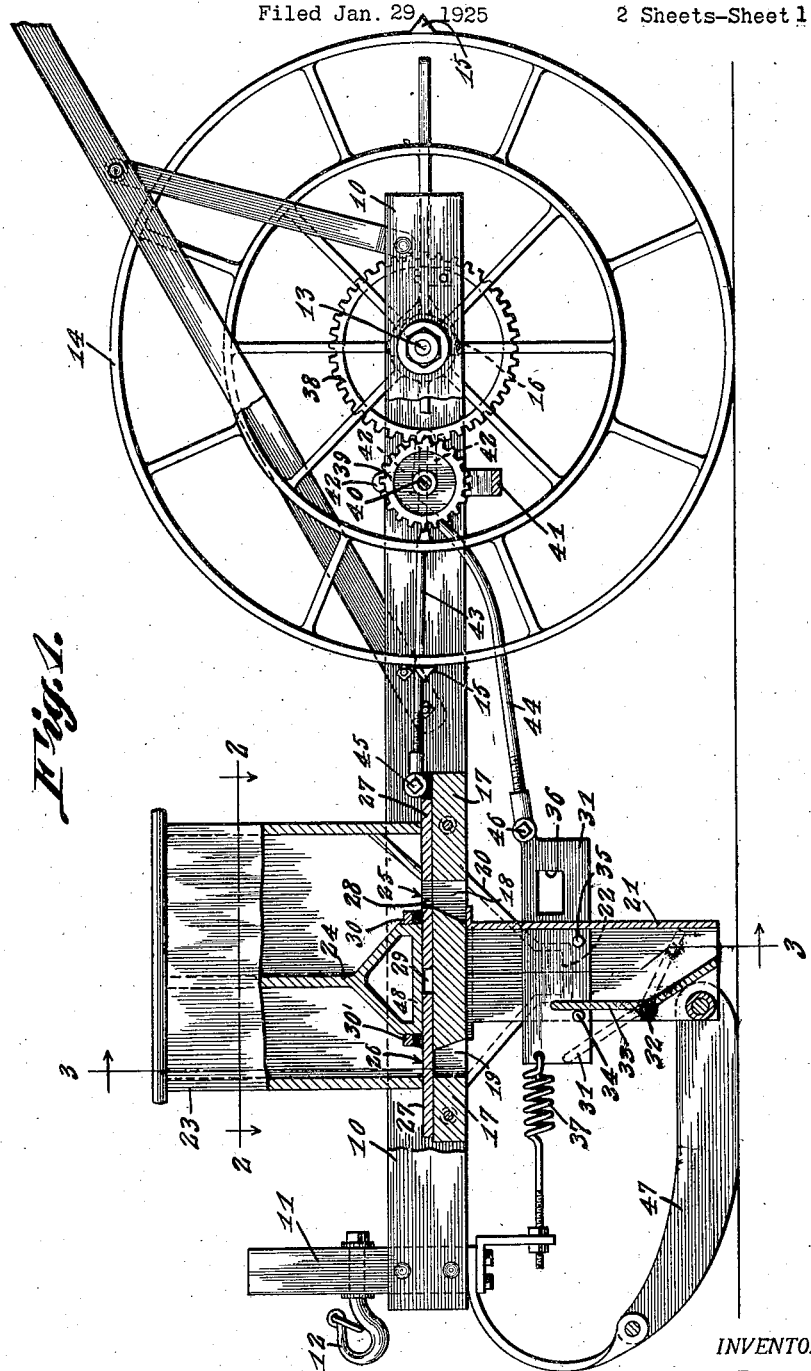
INVENTOR.
Hosea N. Oliver,
BY
Geo. F. Kimmel, ATTORNEY.

Oct. 4, 1927.
H. N. OLIVER
SEED PLANTER
Filed Jan. 29, 1925
1,644,602
2 Sheets-Sheet 2
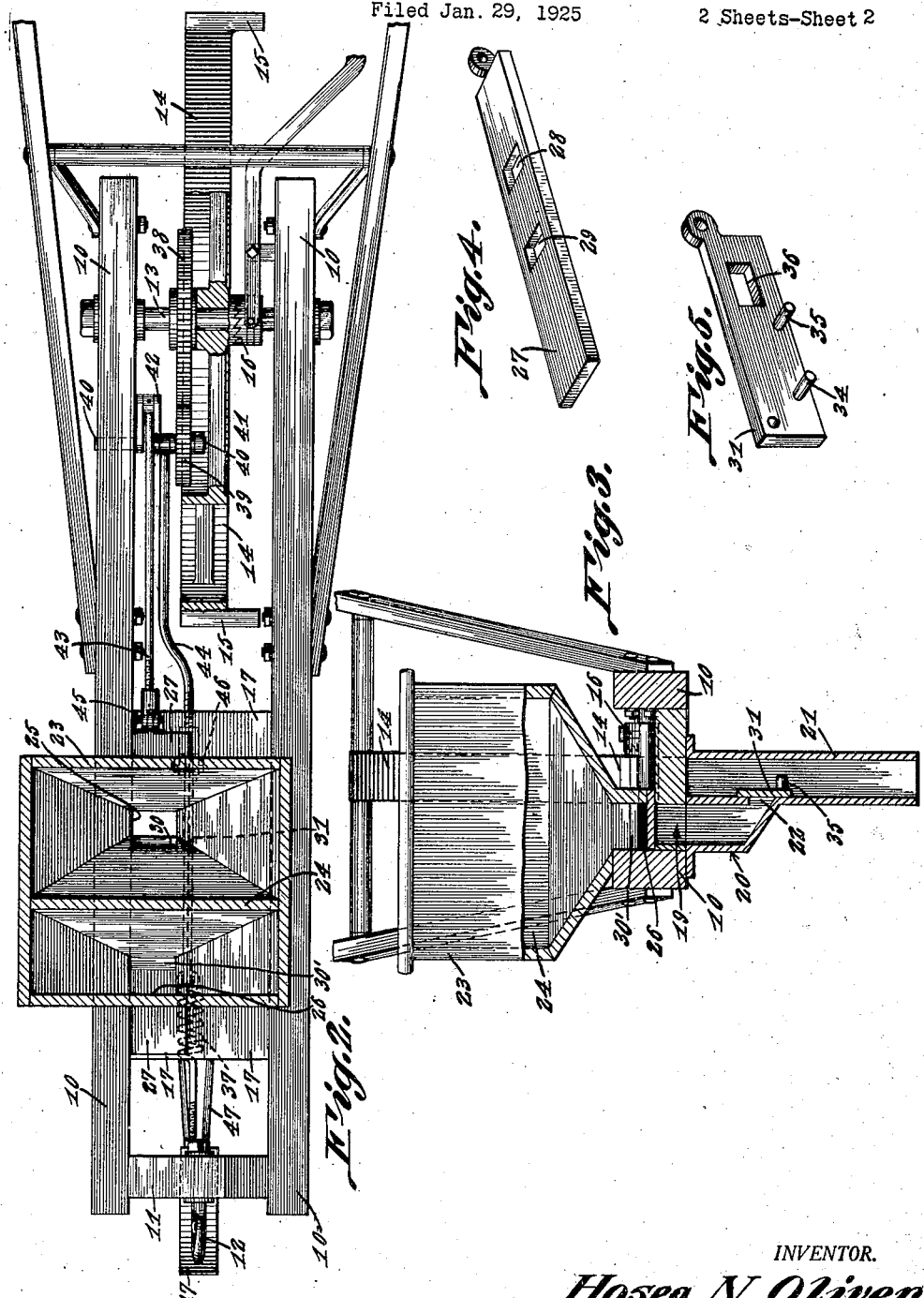
INVENTOR.
Hosea N. Oliver,
BY
Geo. P. Kimmel, ATTORNEY.

Patented Oct. 4, 1927.

1,644,602

UNITED STATES PATENT OFFICE.

HOSEA N. OLIVER, OF HARTVILLE, MISSOURI.

SEED PLANTER.

Application filed January 29, 1925. Serial No. 5,599.

This invention relates to a seed planter and has for one of its objects to provide a device of this character wherein two or more varieties of seeds can be simultaneously delivered for the sowing of the seeds.

Another object of the invention is the provision of a planter of this character, wherein the means employed for accomplishing the desired results is novel in form and automatic in the operation thereof.

A still further object of the invention is the provision of a planter of this character, which is extremely simple in construction, thoroughly reliable and efficient in its purpose, strong, durable, and inexpensive to manufacture.

With these and other objects in view, the invention consists in the features of construction, combination and arrangement of parts, as will be hereinafter more fully described in detail, illustrated in the accompanying drawings showing the preferred embodiments of the invention, and pointed out in the claim hereunto appended.

In the accompanying drawings:—

Figure 1 is a side elevation of a seed planter, partly in section, constructed in accordance with the invention.

Figure 2 is a plan view with the feed hopper in section taken approximately on the line 2—2 of Figure 1.

Figure 3 is a transverse sectional view on the line 3—3 of Figure 1.

Figure 4 is a perspective view of the cut-off element between the receptacle and support removed from the planter.

Figure 5 is a perspective view of the movable plate.

Similar reference characters indicate corresponding parts throughout the several views in the drawings:

Referring to the drawings in detail, the improved device includes a supporting frame formed with spaced longitudinal side members 10 and a forward transverse block 11 to which a hook 12 is attached to carry the draft appliance, not shown.

A shaft 13 extends through the side rails near their rear ends, and mounted for rotation on the shaft is a carrier wheel 14, the latter constituting the traction wheel and has formed thereon marker spurs 15 of the usual type. A combined backing and stop clutch device, represented conventionally at 16, may be employed, if desired.

Extending between the side rails 10 of the supporting frame is a bearing block or support 17 having spaced apertures or passages 18 and 19, respectively, and suspended from the supporting frame is a chute 20 with which both of the apertures 18 and 19 communicate.

Suitably suspended from the chute 20 is a spout 21 with which a discharge opening 22 of the said chute 20 communicates as shown in Figure 3 of the drawings.

Rising from the supporting frame directly over the chute 20 is a seed receptacle or hopper indicated as a whole at 23, the same being provided interiorly thereof with an intermediate partition 24 to divide it into two hopper bins, a relatively large bin for seed corn, and a relatively small bin for pumpkin, pea, bean or other seed, as required. The larger bin is provided with a discharge opening 25, while the other or smaller bin is provided with a discharge opening 26.

A cut-off element 27 is disposed for movement between the hopper 23 and the supporting block 17 and this element is provided with spaced apertures or ports 28 and 29, the port 28 corresponding to and adapted to register with the aperture 18 in the block 17 and the aperture 25 of one of the bins, when the cut-off element 27 is at one end of its stroke, and the port 29 adapted to register with the aperture 19 of the block 17 and the aperture 26 of the other being when said cut-off element 27 is at the other end of its stroke. The ports 28 and 29 are so spaced that when the cut-off element 27 is at one end of its stroke, the openings 18, 25 and 28 will register, and the opening 26 will be cut off, and when the cut-off element is at the other end of its stroke, the openings 19, 26 and 29 will register, and the opening 25 be cut off. The cut-off element 27 thus operates to alternately open and close the discharge from the bins of the receptacle or hopper 23 as hereinafter more fully explained.

Attached to the lower edge of the partition 24 are brushes 30 and 30' operative to prevent the seed from one bin being carried into the other bin by the cut-off element 27 when actuated.

Slidably disposed within the spout 21 is a movable plate represented as a whole at 31, and operative to cut off the discharge opening 22 of the chute 20 when in one position, and open the discharge opening when in another position.

Pivoted at 32 within the spout 21 is another valve device 33. At its upper end the valve device 33 projects between spaced pins 34 and 35, extending from the plate 31 at one side thereof. The pivot 32 for the valve device 33 is located intermediate the ends of said valve device 33, the portion below the pivot being directed obliquely to the portion above the pivot, as shown in Figure 1 of the drawings.

The movable plate 31 is provided with an opening or port 36 adapted to register with the discharge opening 22 in the chute 20 when in one position and is likewise preferably provided with a spring 37 operative to hold the cut off valve or plate yieldably in one position at one end of its stroke.

The shaft 13 is provided with a master gear 38 engaging with a gear 39 on a stub shaft 40, the latter supported by a bracket 41 from one end of the rail members 10. The stub shaft 40 is provided with a double crank 42, these being at right angles to each other and have connected thereto rods 43 and 44, respectively. The rod 43 is coupled at its other end at 45 to the cut-off element 27, while the rod 44 is coupled at its other end at 46 to the movable plate 31. By this arrangement the members 27, 30 and 32 will be intermittently and alternately operated by the rotation of the axle or shaft 13 under the influence of the carrier or traction wheel.

The usual form of furrow opener shoe is shown at 47 and depends from the forward end of the supporting frame and is suitably connected to the chute 21 as shown in Figure 1 of the drawings.

By the arrangement hereinbefore described two different kinds of seeds may be planted in the same hill, for instance corn, together with pumpkin, squash, beans, peas or the like, and alternately and intermittently fed to the discharge spout, and held in the spout a sufficient length of time to cause the seeds to be dropped at suitable intervals to form the uniformly spaced hills.

The discharge openings 25 and 26 in the hopper, the ports 28 and 29 of the cut-off element 27, and the apertures 18 and 19, of the supporting block 17, are so spaced and proportioned, that when at the midway position of the crank members the ports 28 and 29 will be closed by the material of the hopper between the openings 25 and 26 of the bins so that the outflow from the bins of the hopper will be entirely cut off for a period of time during each stroke of the cut-off element 27 to enable the contents of the chute to be discharged without interference from the contents of the hopper.

With the apparatus or planter thus constructed the operation is as follows:—

One of the bins of the hopper is supplied with one kind of seed, for instance corn, and the other bin supplied with another kind of seed, for instance pumpkin seed, squash seed, beans or the like, such as are commonly sowed in the same hill with corn.

Then as the machine is moved over the ground, the motion of the wheel 14 will rotate the double crank 42 and impart reciprocatory motion to the several cut-off devices.

When the crank member to which the cut-off element 27 is coupled arrives at the rear end of its stroke, the port 28 will register with the openings 25 and 18 and permit a certain amount of corn seeds to pass into the chute 20. When said arm of the crank is thus moved to hold the cut-off element 27 in position to allow corn to pass, the other port 29 will be closed beneath the stop portion 48 of the seed hopper and prevent the contents of the other bin from passing to the chute 20. In the meantime the other crank member will be in its halfway position and move the movable plate 30 into closed position, or with its port 36 externally of the spout and with the discharge opening of the chute closed or in the position shown in Figure 1 of the drawings.

As the rotation of the crank continues the cut-off element 27 is moved forwardly until the port 29 registers with the openings 19 and 26 and permits the seeds from the other bin to pass, but cuts off the flow from the corn bin.

When the crank member which controls the motion of the cut-off element 27 is at its half way point, the ports 28 and 29 will be in neutral position or beneath the cut-off portion 48 of the seed hopper, and cutting off both bins, and thus preventing any further flow to the chute.

When the crank member which controls the movement of the cut-off element 27 is at its half way point the other crank member which controls the movement of the movable plate 31 will move the latter with its port 36 in registration with the discharge opening 22 in the chute, and permit the contents of the chute to flow into the spout 21.

As the rotation of the crank continues, the movable plate 31 is moved to again cut off the discharge 22 and alternately open the ports 28 and 29 and repeat the operation.

Having thus described this invention, what I claim is:—

In a planter of the character described, a delivery spout, a chute at one side of and opening laterally into said spout, a perforated vertically disposed slide mounted transversely in the spout and intersecting the communication between the chute and spout, a vertically swinging valve in the spout below the slide and automatically tripped by the latter, means for tensioning the slide, means operable on advancement of the planter to actuate the slide, means for feeding alternately materials to the chute, and means synchronously operated by the first named means to control the feeding means.

In testimony whereof, I affix my signature hereto.

HOSEA N. OLIVER.